Jan. 12, 1932.          H. A. HICKS           1,840,901
                          AIRPLANE
                Filed March 16, 1931    4 Sheets-Sheet 1

INVENTOR.
H. A. Hicks
BY
ATTORNEY.

Jan. 12, 1932.　　　　H. A. HICKS　　　　1,840,901
AIRPLANE
Filed March 16, 1931　　　4 Sheets-Sheet 2
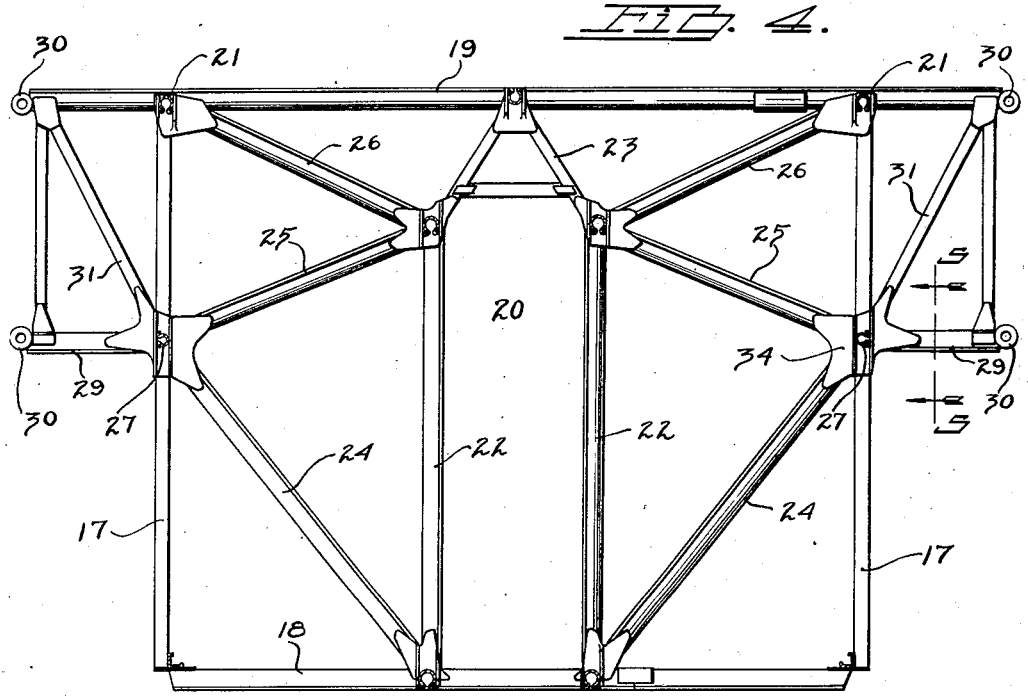
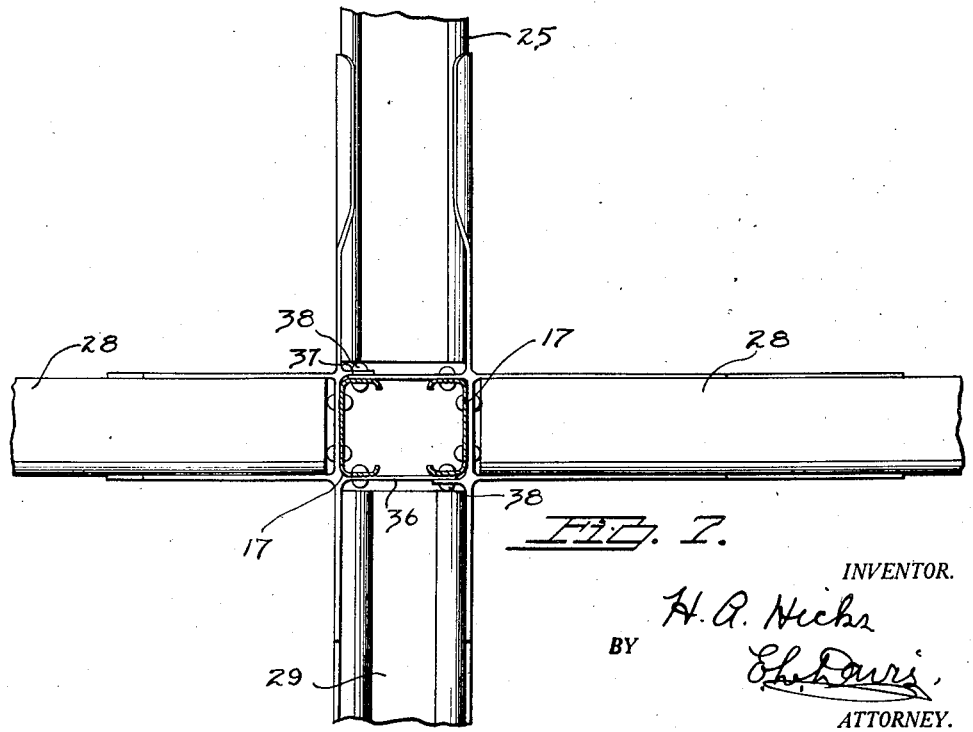
INVENTOR.
H. A. Hicks
BY
ATTORNEY.

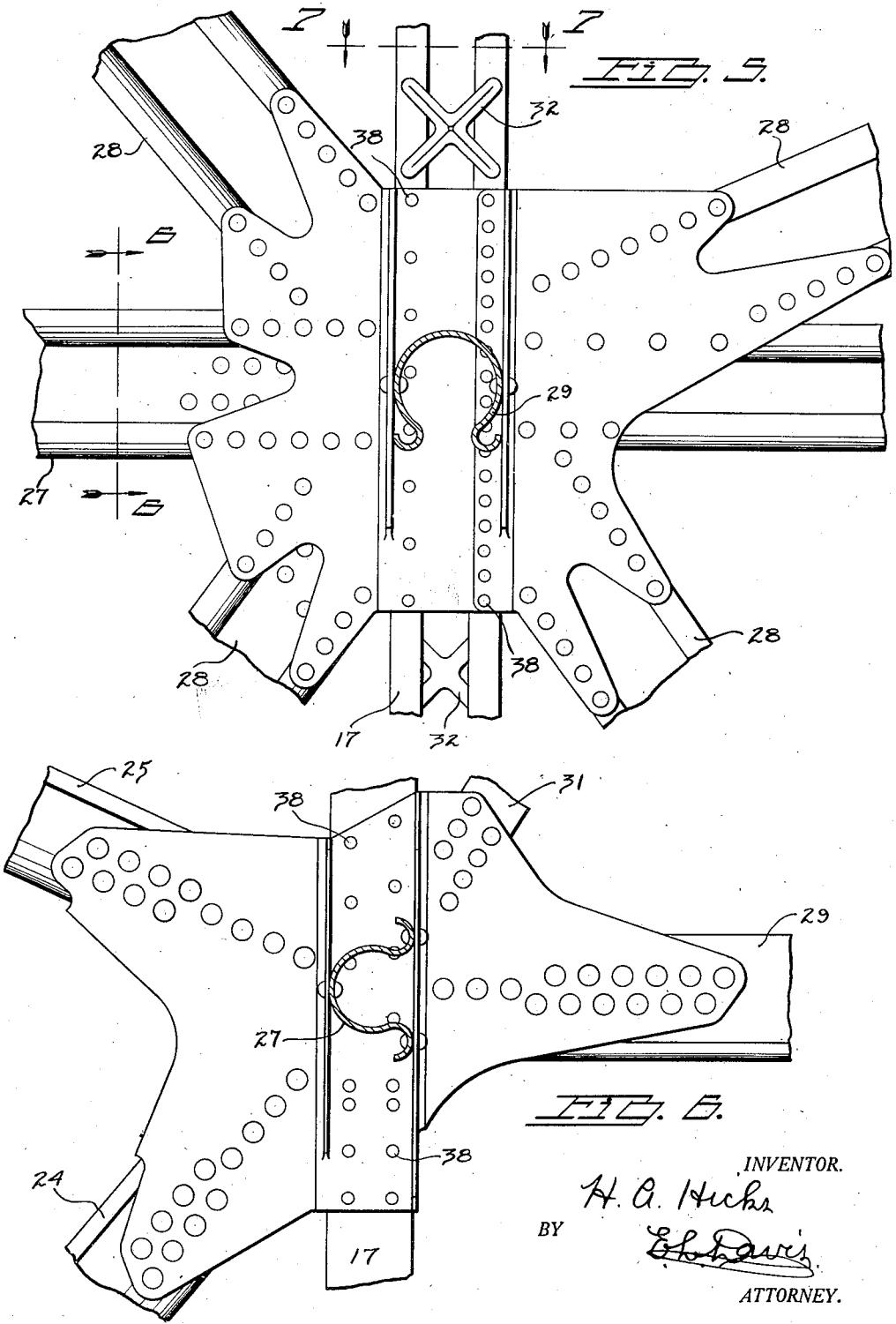

Jan. 12, 1932.  H. A. HICKS  1,840,901
AIRPLANE
Filed March 16, 1931  4 Sheets-Sheet 4
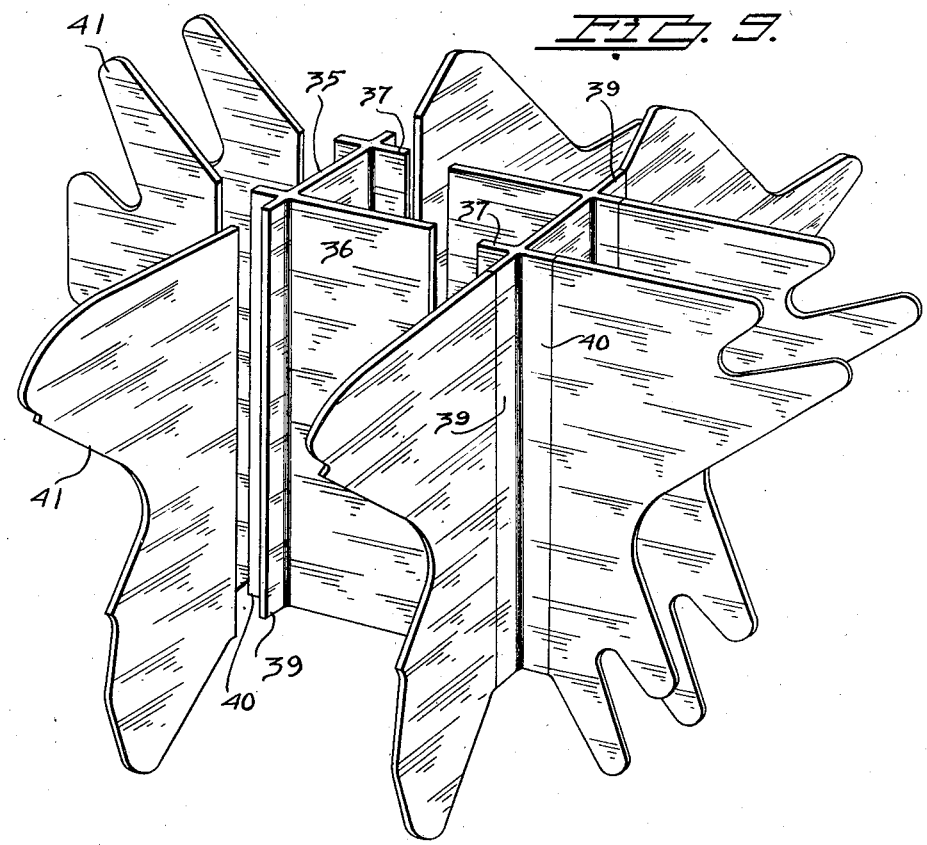
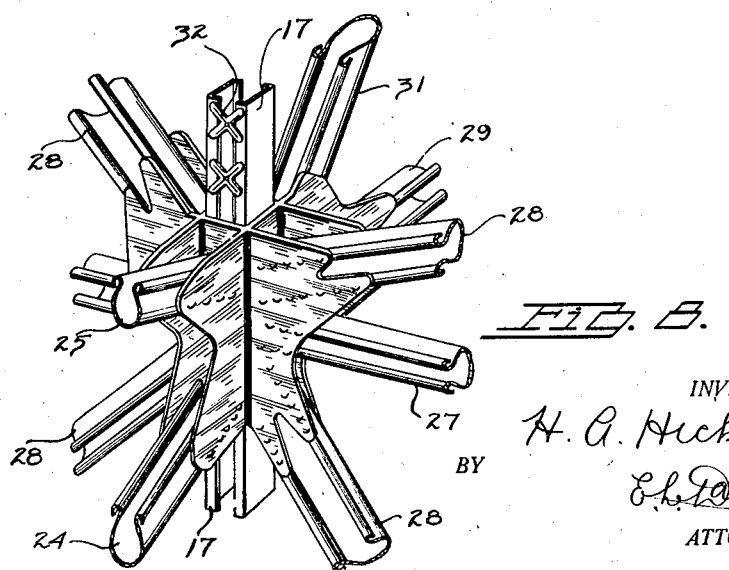
INVENTOR.
H. A. Hicks
BY
ATTORNEY.

Patented Jan. 12, 1932

1,840,901

UNITED STATES PATENT OFFICE

HAROLD A. HICKS, OF DETROIT, MICHIGAN, ASSIGNOR TO FORD MOTOR COMPANY, OF DEARBORN, MICHIGAN, A CORPORATION OF DELAWARE

AIRPLANE

Application filed March 16, 1931. Serial No. 522,873.

The object of my invention is to provide an airplane having a novel fuselage construction, which construction is made possible by the use of a unique structural joint. My structure is specially suitable for use in large airplanes of the transport type and particularly in monoplane structures of the high wing type. In this latter type of plane, a single wing projects from each side of the fuselage to form the lifting surfaces and it is one purpose of this invention to provide a fuselage strong enough to resist the enormous strains set up by these large wings. Such planes are invariably of the cabin type with a passageway extending the full length therethrough whereby it will readily be seen that the wing spars cannot be extended through the fuselage, as in such case the passageway would be blocked. The fuselage must, therefore, be of strength sufficient to support these wings from each side thereof without any bracing extending across the fuselage between the wings. My improved fuselage is adequate to support these wings because of its novel bulkhead construction, which bulkheads transmit the wing strains and at the same time permit a passageway or aisle running the length of the plane. A lighter and stronger structure results from this construction.

Still a further object of my invention is to provide a fuselage constructed as a series of compartments to thereby increase the strength of the structure without the use of excessively heavy frame members. The ordinary airplane practice for fuselage construction is to provide four longérons held in fixed relation to each other by a plurality of struts so as to define a streamlined box of rectangular section.

In large planes these struts become excessively long due to the great width and height of the fuselage so that their unsupported center portions must be of large cross section to resist buckling. Diagonal wire bracing or rods cannot be extended across such cabin fuselages, as is ordinarily done in small planes, because such bracing would restrict the use of the cabin for carrying purposes. Consequently, corner braces and large sectioned beams have up to now been employed to prevent collapsing and weaving of the fuselage, which bracing becomes more and more inadequate as the size of the plane is increased. In the plane disclosed herein, the transverse strains are absorbed by a plurality of bulkheads which, although constructed from relatively small members, still effectively support the fuselage against failure. These bulkheads are of graduated sizes which, when connected at spaced intervals, defines a streamline-shaped fuselage.

Several experimental planes have been attempted using bulkheads for supports, but as far as the applicant is aware, all of these were abondoned because of the impossibility of tying the bulkheads together to resist both the longitudinal loads of the fuselage and the transverse loads of the wings. I have provided a structural joint which will transmit stresses through a common point from two or more directions so that by using such joint the bulkhead construction is not only feasible but in many ways easier to produce than the conventional type structure. The successful application of the bulkhead principle is the direct result of my improved structural joint and it is believed to be commercially impossible to provide such construction without making use of this joint or adaptation thereof.

More particularly, the object of my invention is, therefore, to provide a structural joint especially suitable for use in the fabricating of airplanes, which joint will have exceptionally great strength, will be inexpensive to manufacture, and will allow the airplane designer a greater leeway than he was heretofore permitted. This joint is particularly adapted for structures requiring stresses to be transmitted through two intersecting planes, such as in the example first given where the side walls of the fuselage must be tied in with the bottom face of the wing.

The usual practice adapted in structural work of this nature consisted in providing gusset plates which were secured to each side of all the intersecting beams in one plane to thereby adequately fasten these members. This method of securing structural members is entirely satisfactory where all of the stresses lie in a single plane, but in many instances stresses from without this plane must be anchored at the intersection. The means heretofore employed in these instances consisted of riveting angle members to the sides of the gussets to which the beams carrying these outside stresses were secured. In such structure the rivets securing the angle members to the gussets were necessarily placed under tension which not only tended to distort the angles, unless extremely heavy and rigid angles were provided, but further tended to pull the heads from the rivets if any appreciable load was put on the intersecting members. The inadequacy of such structure will readily be apparent where heavy loads or stresses, as is common in airplane construction, are to be resisted.

This limitation is even more apparent where thin sectioned aluminum or alloy beams are used. The members secured by the gusset plates may be fastened by several rows of small rivets to distribute the load over a large surface because the stress tends to shear all of the rivets simultaneously. However, in securing the angle plates to the gussets only the single row of rivets nearest to the corner of the angle is effective in resisting the load. This single row is also placed under tension which tends to progressively pull the heads of each successive row of rivets as the angle is pulled away from the gusset. My improved joint can readily be made to transmit loads in a number of planes and I am able to accomplish this advantageous result without adding to the weight of the structure and with little or no increase in cost thereof.

With these and other objects in view, my invention consists in the arrangement, construction, and combination of the various parts of my improved device, as described in the specification, claimed in my claims, and illustrated in the accompanying drawings, in which:

Figure 4 shows a plan view of one of the bulkheads used in the fuselage, shown in Figures 1 through 3.

Figure 5 shows a sectional view taken on the line 5—5 of Figure 4.

Figure 6 shows a sectional view taken on the line 6—6 of Figure 5.

Figure 7 shows a sectional view taken on the line 7—7 of Figure 5.

Figure 8 is a perspective view of the joint, shown in Figures 5, 6 and 7.

Figure 9 is a perspective view of my improved joint structure illustrating the manner in which it is assembled.

Figure 2:
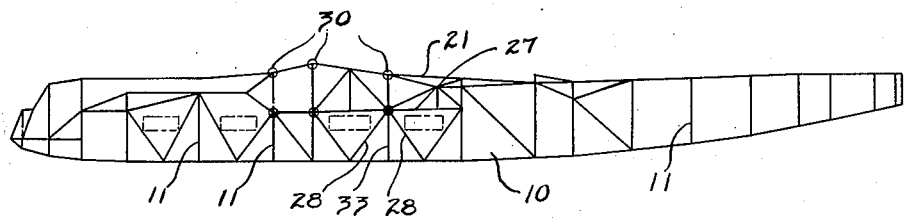
Figure 2 is a diagrammatic side view of the fuselage, shown in Figure 1, illustrating the main structural members used therein.
Figure 3:
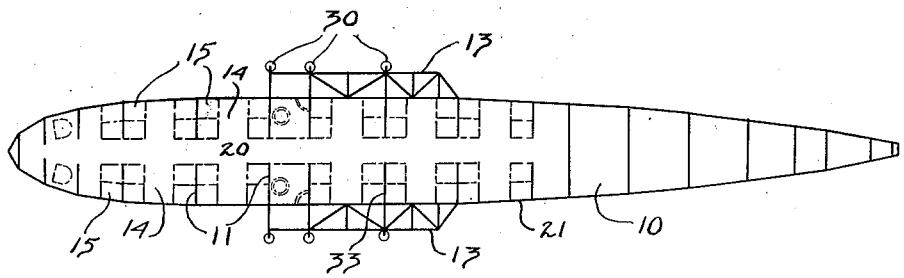
Figure 3 is a diagrammatic top view of the fuselage, shown in Figure 2.
Figure 1:
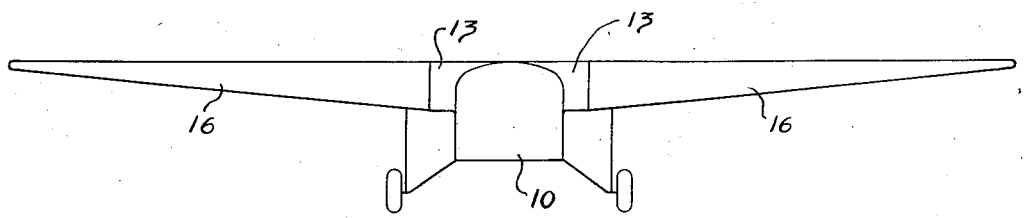
Figure 1 is a front view of an airplane having my improved type construction used therein.

Referring to the accompanying drawings, I have used the reference numeral 10 to indicate an airplane fuselage of generally rectangular section which is built up by securing together in spaced relationship a plurality of bulkheads 11. These bulkheads are each provided with a central passageway therethrough and are so spaced that they form a series of compartments 14 extending the length of the fuselage. Passenger seats 15 are installed in most of these compartments on each side of the passageway from which it will be apparent that this type of construction is primarily for large passenger-carrying planes. The main purpose of the bulkheads 11 is to form structural members and only incidentally to form the passenger compartments. Referring to Figures 2 and 3, nine of these compartments are provided, each being connected to the adjacent compartments by the passageways through the bulkheads.

A pair of wing stubs 13 extend outwardly from the sides of the fuselage near its center so that internally braced wings 16 may be detachably secured thereto. The wings may, if desired, be secured directly to the sides of the fuselage but it is believed easier to split the wing a short distance from the fuselage so that the fittings may be more accessible. The bulkheads 11 are primarily provided to support the sides of the fuselage adjacent to the wing stubs and inasmuch as these bulkheads differ little, except in size, only one head, as designated by numeral 33 in Figures 2 and 3, will be described.

Each bulkhead consists of a pair of vertical built-up side members 17 which extend upwardly from a transverse sill member 18 to the top of the bulkhead. A roof member 19 extends between the upper ends of the side members 17 and continues outwardly from each member the length of the stub wings. In fact, these projecting portions define the upper surfaces of the wing stubs. The lower surfaces of these wings are defined by tension members 29, which extend from the intermediate portions of the struts 17 outwardly so as to be aligned with the ends of the roof member 19. Clevis members 30 are secured to the outer ends of the members 19 and 29 by which the main wings 16 may be fastened in place and vertical braces 31 extend between the ends of these members to form in effect a short wing spar.

Referring to Figures 2 and 3, these clevises are shown diagrammatically by circles, also numbered 30 from which it will be seen that three bulkheads are required to support the wings and define the stub wing sections. The wing members 16 are each formed around three main wing spars which extend the length of each wing and which are aligned with each pair of clevis members 30, suitable clevises being secured to the top and bottom beams of these spars so that by the insertion of clevis pins the wings will be secured to the fuselage.

From the foregoing it will be seen that the lift of the wings place the upper group of clevises under compression, while the lower group are under tension tending to pull away from the sides of the fuselage. This stress is many times greater than the total weight or lift of the plane, due to the relatively small vertical distance between the top and bottom groups of clevises in comparison to the large distance between the center of lift of the wing and these clevises, from which it will be seen that a lift of only two tons by each wing will exert an outward tension stress of eight or ten tons on the clevises which in turn are resisted by the bulkheads 13. It would be a relatively simple matter to provide a tension member between the lower pairs of clevises in the same manner as the member 19 extends between the upper pairs, however, such tension members would prevent having a passageway through the fuselage and cannot therefore be provided.

My improved bulkheads form a simple but very effective means for tying together the lower groups of clevises, while at the same time permitting a passageway to be formed through the fuselage. Referring to Figure 4, a pair of vertical struts 22 extend upwardly from the sill 18 and are spaced a sufficient distance to define an aisleway 20 through the center of the bulkhead. The upper ends of these struts are connected by the legs of a triangular brace 23, the upper angle of which is connected to the intermediate portion of the roof member 19. In order that the intermediate portions of the struts 17 may be supported laterally, I have provided diagonally extending beams 24 which extend from the intersection of the struts 22 and 18 outwardly to the intersection of the struts 17 and 29. Likewise, a diagonal brace 25 extends from this latter intersection to the upper end of the adjacent strut 22 where it is secured to the triangular bracing 23. Still another diagonal brace 26 extends from the upper end of the struts 22 back to the top of the struts 17.

From the foregoing, it will be seen that even though I have provided a clear passageway through the center of each bulkhead, still the bulkheads are rigidly supported against distortion. The roof member 19 is supported against buckling at its center point and further, a portion of its load is transferred to the braces 26 to thereby increase the factor of safety. The tension load on the members 29 is partly taken through the braces 24 and partly through the braces 25. Inasmuch as the brace 25 is under tension and the brace 26 is under compression and having their ends connected, these forces cancel out without being transferred through the triangular brace 23. This novel bulkhead, although simple in design, solves a difficult problem in the designing of large monoplanes and it is my intention to cover this structure by my claims, together with all reasonable adaptations thereof.

To form my fuselage a series of these bulkheads are secured in spaced relationship by means of longitudinal members 21 which extend between the corners of the bulkheads. Intermediate longitudinal members 27 extend between the intermediate portions of the struts 17, 18 and 19 to prevent longitudinal buckling of these members; and further, diagonal braces 28 extend between the intersections of the longérons and the struts 17 to stiffen the fuselage in a lengthwise direction.

It will be seen that a vertical strut 17, longitudinal members 21 and 27, and diagonal members 28 all lie in the same plane, that is in the side of the fuselage, and all intersect at a common point. It will also be seen that the tension member 29, braces 24, 25 and 31 also intersect at this same point and that they lie in a plane perpendicular to the side of the fuselage. Inasmuch as very large stresses are carried through this common point in both planes, neither can be sacrificed for the benefit of the other and therefore the ordinary gusset plate joint having angle plates riveted thereto is not adequate for use at this point. I have provided a joint structure of novel design which is shown in Figures 5 through 9 and in which all of the rivets used therein are under a shearing load and which are provided with ample riveting surfaces so that any desired stress may be transmitted through each of the intersecting planes.

The joint which will be described in detail is given the reference numeral 34 in Figure 4, however, the joints at the other intersections are constructed on the same principles and differ only in size and in the shape and distribution of the strut fastening members. In general, the joint 34 consists of a pair of channel-shaped members adapted to straddle the strut 17, their arm portions being riveted together and to the strut to form a rectangular enclosure closely fitting therearound. I have provided a pair of spaced parallel flanges extending outwardly from each side of this rectangular enclosure, which flanges straddle all of the various beam members in the plane in which they extend.

Referring to Figure 9, these channel members, designated by numeral 35, are preferably formed as rolled stock so that the channels may be conveniently cut to whatever length is desired for the particular fitting. Although the particular type of strut 17 is immaterial, the member shown here is of the built-up type consisting of two rolled sections joined together by suitable clips 32 to form a rectangular section around which the fitting is secured. Referring to Figure 7, the arms of the channels 35 are of unequal length, the long and short arms being designated by numerals 36 and 37, respectively. The channels are so disposed around the strut that one long and one short arm overlap each other adjacent to one of the rolled sections comprising the strut 17 so that these three sections may be permanently secured together by a single row of rivets 38.

Each of the channels 35 are rolled with a pair of aligned integral ribs 39 aligned with the channel webs, which ribs project outwardly a short distance from the arms 36 and 37. Likewise, a pair of parallel ribs 40 project away from the web in position aligned with the arms 36 and 37, respectively, from which it may be seen that the channel members when assembled to the strut are provided with four pairs of spaced parallel ribs, each pair radiating from one side of the strut 17.

The method of fabricating the plates whereby the various braces and struts are secured to my fitting are shown in Figure 9. I have provided for each fitting four pairs of plates 41 formed from relatively thin steel stampings, the particular shape of each depending upon the positions of the struts to be anchored. Inasmuch as omega sectioned struts formed from thin dural stock are used almost exclusively in the bulkhead shown, the plates 41 must each be of a quite large size to distribute the loads over a large area on the struts. The plates are of many different sizes and shapes because the surplus metal is removed wherever possible to lighten the plates without sacrificing their strength. It will be apparent that the particular shape of each pair of plates 41 will depend upon the angle at which the braces intersect the joints, although the sections of all the braces may be of the same general shape. These plates 41 are butt-welded to the ribs 39 and 40 so that an integral construction results. These plates are stamped from very thin and strong steel so that a light structure results, although in the drawings they are shown considerably thicker than required in the actual fitting, to better illustrate the construction.

To assemble my improved joint, two of the channels 35 with their plates welded thereto, are riveted around the strut 17 and then the various bracing members inserted between their respective plates and then riveted thereto. These plates 41 are of sufficient length to accommodate the required number of rivets for the load applied and as some of the braces carry many times the load of others and are consequently rolled from thicker material, a greater number of rivets is required to secure these in place. It will further be noted that all of the rivets used in this joint are stressed under shear which insures that all of the rivets for each particular brace will be placed under equal strain and the load applied simultaneously to all of the rivets.

The advantages of this structure over the conventional gusset and angle plate construction is apparent in that the rivets securing the angles are stressed under tension and unless the angle sections are made abnormally heavy, so as to resist all bending distortion, only the few rivets nearest to the corner of the angles will be required to carry all the load. This has frequently caused failure because the rivet heads progressively pull away so that the angle is loosened from the gusset plate.

Still a further advantage of my structure arises when omega sections are used in that no force tends to pull the arm members of the braces apart. In the older construction the gusset plates were held together only by the brace members, and if omega sectioned members were used very little resistance would be offered to the spreading of the gusset plates due to the pull of the angle plates secured thereto.

Still a further advantage arising from the use of my improved joint is that I am enabled to construct an airplane having a novel fuselage construction built up from a plurality of bulkheads, which not only increases the longitudinal strength of the fuselage but further ties the wings together while allowing a passageway through the fuselage. This feature is of primary importance in the construction of large monoplanes.

Still a further advantage of this device is in the novel joint. Although I have shown in detail only one particular joint, it is apparent that in each of my bulkheads there are seven major joints constructed according to the principles disclosed herein. It will also be apparent to the plane designer that this joint can be advantageously used in numerous other places in the airplane.

Some changes may be made in the arrangement, construction, and combination of the various parts of my improved device without departing from the spirit of my invention, and it is my intention to cover by my claims such changes as may reasonably be included within the scope thereof.

I claim as my invention:

1. In an airplane, a fuselage comprising a bulkhead extending thereacross, a passageway extending through the central portion of said bulkhead substantially the full height thereof, wings secured to each side of said bulkhead between the top and bottom thereof so as to intersect intermediate portions of the fuselage sides, and diagonal bracing members extending from said intersection to the top and bottom of said fuselage to thereby circumvent said passageway, whereby the wing stresses on the sides of the fuselage will be resisted.

2. In an airplane, a fuselage comprising a plurality of transverse bulkheads longitudinally spaced therein, a passageway extending through said bulkheads substantially the full height thereof, integral wing stubs extending from the sides of said bulkheads, means for detachably securing wings to said wing stubs, and diagonal bracing members extending from the intersections of said wing stubs and bulkheads to the top and bottom of said fuselage to thereby circumvent said passageway, whereby the wing stresses on the sides of the fuselage will be resisted.

3. In a structural joint, a pair of interlocking channels having their arms secured together, and a plurality of plates secured to and extending radially from said channels, whereby braces secured to the plates of the respective channels will be secured together.

4. In a structural joint, a pair of interlocking channels having their arms secured together and to an enclosed strut, and a plurality of plates secured to and extending radially from each of said channels, whereby braces riveted to the plates of each channel will be secured together and to said strut.

5. In a structural joint, a pair of interlocking channels having their arms riveted together and to an enclosed strut, and a plurality of plates secured to and extending radially from said channels whereby braces riveted to said plates will be fixedly secured together and to said strut.

6. In a structural joint, a pair of interlocking channels having their arms riveted together and to an enclosed strut, and pairs of parallel plates secured to the backs and sides of said channels so as to extend radially from said strut at substantially 90° intervals, whereby braces secured between each pair of said plates will be fixedly secured together and to said strut.

7. In a structural joint, a pair of channels having their arms riveted to an enclosed strut, outwardly extending ribs formed in the back and sides of said channels, and a plurality of plates secured to said ribs, whereby braces fastened to said plates will be secured to said strut.

8. In a structural joint, a pair of channels having their arms riveted to an enclosed strut, outwardly extending ribs formed in the back and sides of said channels so as to form a plurality of pairs of parallel ribs extending radially from said strut in angular relation to each other, and a plurality of plates secured to said ribs, whereby braces fastened to said plates will be fixedly secured together.

9. In a structural joint, a pair of channel members having their arms in position around the opposite sides of a central strut to which said channels are secured, outwardly extending ribs formed in the back of said channels, and plates welded to said ribs, whereby braces fastened to said plates will be secured to said strut.

10. In a structural joint, a pair of channels having their arms riveted to an enclosed strut, outwardly extending pairs of parallel ribs rolled lengthwise in said channels, and plates welded to said ribs, whereby braces riveted between said pairs of parallel plates will be fixedly secured to said strut.

HAROLD A. HICKS.